Feb. 5, 1963

E. W. MANTEUFFEL

MAGNETIC VOLTAGE STABILIZER EMPLOYING CONTROLLED SILICON RECTIFIERS 3,076,924

Filed Feb. 4, 1960

2 Sheets-Sheet 1

Inventor:
Erich W. Manteuffel,
by Allen E. Amgott
His Attorney.

Inventor:
Erich W. Manteuffel,
by Patrick D. Ward
His Agent.

United States Patent Office 3,076,924
Patented Feb. 5, 1963

3,076,924
MAGNETIC VOLTAGE STABILIZER EMPLOYING CONTROLLED SILICON RECTIFIERS

Erich W. Manteuffel, Ithaca, N.Y., assignor to General Electric Company, a corporation of New York Filed Feb. 4, 1960, Ser. No. 6,686
13 Claims. (Cl. 323—22)

This invention relates to saturable reactor technology and more particularly to a new type of lightweight magnetic voltage stabilizer which is characterized by excellent stability and minimal losses as compared to present day magnetic stabilizers.

The present invention contemplates a new type of magnetic voltage stabilizer with properties dissimilar to those of conventional magnetic stabilizers. In the several embodiments of the invention, there are provided embodiments of improved magnetic voltage stabilizers which exploit the phenomenon of ferroresonance in conjunction with the properties of controlled silicon rectifiers.

The concept of coupling a load circuit across a non-linear oscillatory circuit comprised of a capacitor connected in parallel with a saturable inductor has been analyzed and treated in the technical literature. For instance, in an article entitled "Oscillating Circuit Incorporating a Choke With Rectangular Hysteresis Curve," published by Buchhold and Stuhlinger, in Technical Report No. 70, Redstone Arsenal, January 15, 1952, it is demonstrated that where the hysteresis loop of the core for the saturable inductor used in this type circuit is properly rectangular, it is possible to generate an output voltage having a half-cycle average value which is inherently constant despite large fluctuations in the value of input voltage over a wide range.

The concept and details of circuitry for controlling the flux-swing within the saturable core of such a non-linear oscillatory circuit are broadly disclosed in an article entitled "The D-C Controlled A-C Voltage Source, A New Magnetic Amplifier," written by Manteuffel and McCary and appearing in the November 1957 issue of the periodical Communication and Electronics which is published by the American Institute of Electrical Engineers. An improvement over the circuitry and components disclosed in this article forms the subject matter of a co-pending application filed by the assignee of the present invention, entitled "Magnetic Amplifiers With Shunt-Load and Amplitude Controlled Output Voltage," Serial Number 6,733, filed February 4, 1960.

In the type of known magnetic voltage stabilizers disclosed in these prior art publications, and illustrated in the accompanying drawings for the purpose of more clearly explaining the theory of the invention, it is necessary for the capacitor to discharge through the saturated inductance of the shunt-connected saturable reactor. It may be readily shown that the copper loss occurring in such a reactor is given approximately by the expression:

$$P_{cu}=E_o^2C\sqrt{C/L_s}.(R\pi f)$$

where:

$P_{cu}$=copper loss,
$E_o$=average value of rectangular output voltage,
$C$=value of capacitance,
$L_s$=value of saturated inductance of the reactor,
$R$=A.C. resistance of the reactor winding, and
f=value of supply frequency.

This copper loss occurs when the core of the reactor is driven far into saturation during the flow of transient charging current from the capacitor through the saturated inductance of the reactor. During this interval, severe core losses are also produced in the core of the saturable reactor.

The copper and core losses which thus occur determine the size and weight of the reactor which must be employed in a magnetic voltage stabilizer circuit. As a result, a relatively large heavy reactor characterized by undesirable bulkiness is now required in modern day voltage stabilizers. As the output requirements of such a reactor increase, the situation becomes increasingly severe, because of the need for an even heavier and more bulky unit.

The present invention contemplates a new type of magnetic voltage stabilizer which entirely eliminates any need for a heavy oversize reactor, and obviates the former tolerance of high copper and core losses. In this manner, a voltage stabilizer of light weight, low losses, and minimum space requirements is provided.

In order to achieve this goal, the reactor component required in known types of stabilizers is replaced in certain embodiments of the present invention with a very small saturable reactor which acts with a small pulse transformer and a set of controlled silicon rectifiers. With this system, excellent stability in output voltage is maintained despite sharp and frequent fluctuations in the value of input potential.

In other embodiments of the invention, a plurality of diodes are employed in conjunction with a small light-weight saturable reactor to provide a stable value of output voltage. The embodiments of the invention are thus of direct and significant utility in lightweight military and industrial applications where optimum stability in output potential must be achieved despite large variations in the value of the input voltage. For instance, in piloted or in unmanned air-borne vehicles where a filtered direct current output voltage is required, the use of the invention will be highly advantageous because of the need for employing a minimum number of filtering stages in conjunction therewith.

Accordingly, therefore, a primary object of the present invention is to teach circuitry and components for an improved magnetic voltage stabilizer in which controlled silicon rectifiers are used in conjunction with a pulse transformer and a small saturable reactor to provide a relatively lightweight stabilizer with minimal core and copper losses.

Another object of the present invention is to disclose a magnetic voltage stabilizer employing controlled silicon rectifiers in order to provide an output voltage stability and weight factor inherently superior to prior art magnetic stabilizers.

A further object of this invention is to teach a method of constructing magnetic voltage stabilizers characterized by relaitvely light weight, reduced losses, and an output voltage value which is substantially constant in spite of large fluctuations in the amplitude of the supply potential.

These and other objects and advantages of the present invention will become apparent by referring to the accompanying detailed description and drawings, in which like numerals indicate like parts, and in which.

Figure 2:
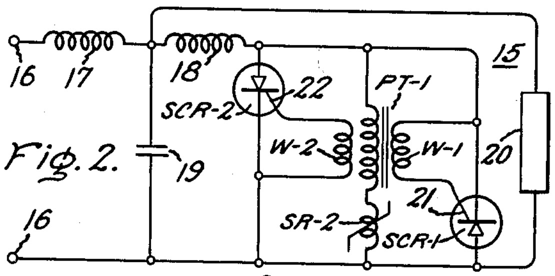
FIGURE 2 illustrates one embodiment of the type of magnetic voltage stabilizer constructed according to the teachings of the present invention.
Figure 3:
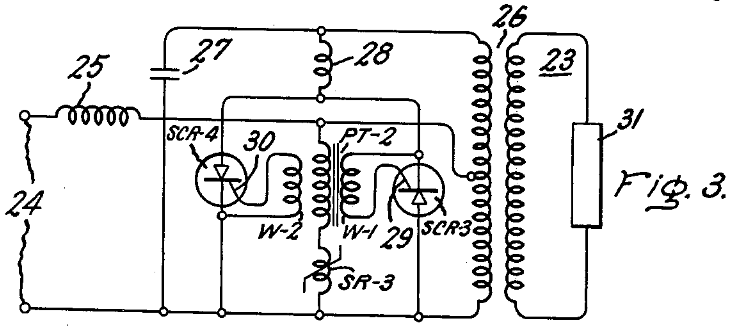
Figure 4:
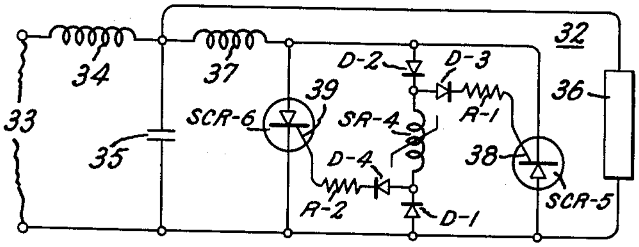
Figure 5:
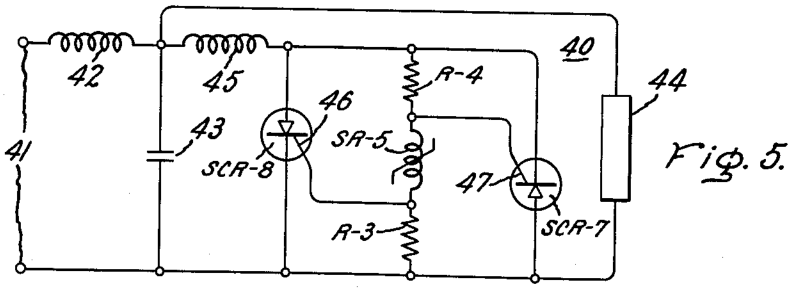
Figure 6:
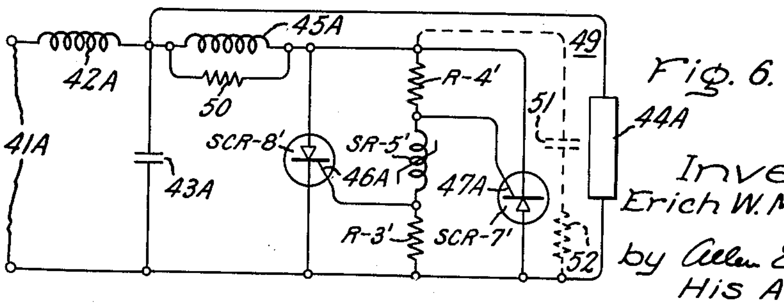
Figure 2B:
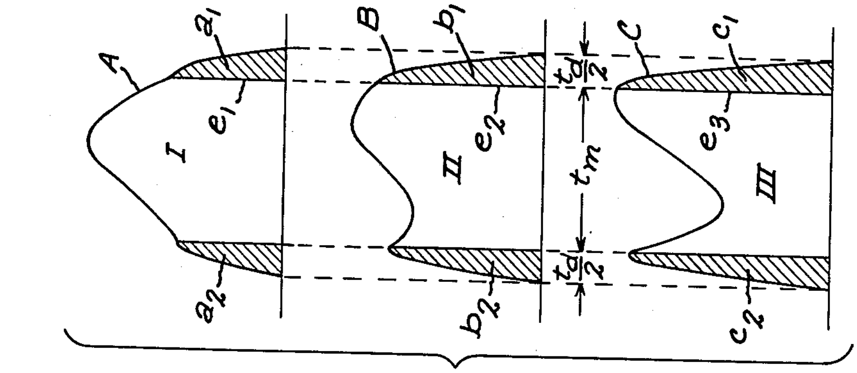
Figure 2A:
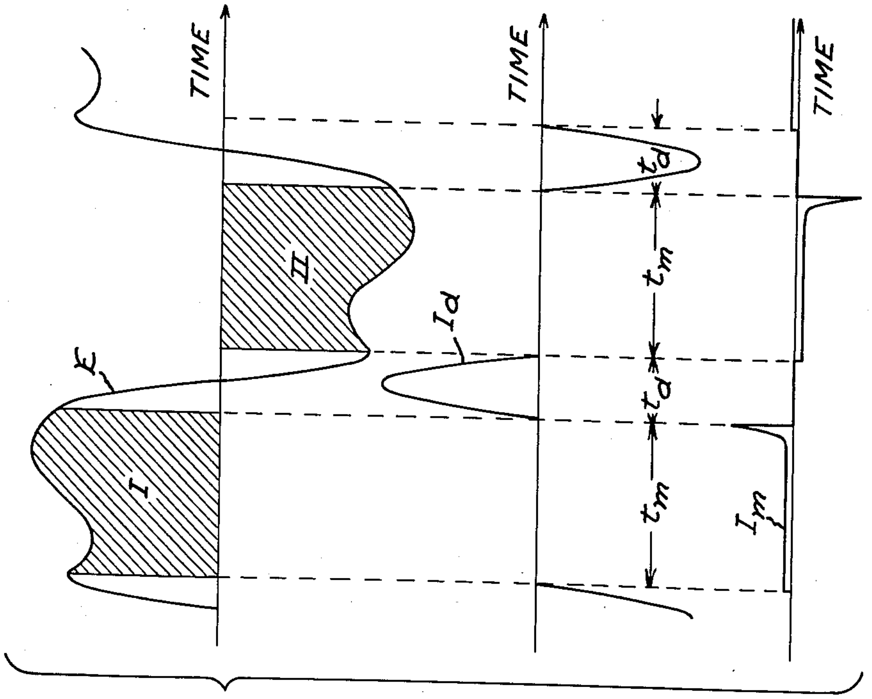

FIGURES 2*a* and 2*b* are graphical representations for the magnetic voltage stabilizer shown at FIGURE 2, showing, as a function of time, the output voltage, discharge currents of capacitor 19 and currents in the winding of the saturable reactor SR–2;

FIGURE 3 is a modification of the circuit shown in FIGURE 2 and illustrates the use of a capacitor of higher volt-ampere rating in producing an increased value of output voltage;

FIGURE 4 shows an improvement in the basic circuitry in which a plurality of diodes are used in place of a pulse transformer;

FIGURE 5 shows an embodiment of the invention in which a direct connection for the firing circuits of the controlled silicon rectifiers is provided; and FIGURE 6 illustrates a modification of the magnetic voltage stabilizer circuit shown in FIGURE 5. In this circuit, means are provided for dissipating the energy stored in the inductive field in order to protect the controlled silicon rectifiers from over-voltages.

Figure 1:
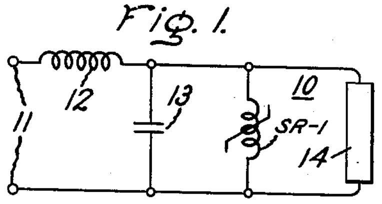
FIGURE 1 shows a schematic diagram of a prior art type of magnetic voltage stabilizer circuit which is used in explaining the invention.

Turning now to the detailed description of the invention, and referring more particularly to the drawings, the numeral 10 has been used in FIGURE 1 to indicate generally a conventional magnetic voltage stabilizer circuit. The stabilizer circuit 10 will be seen to include a pair of input terminals 11. One of the input terminals is connected to one end of a linear inductance 12. The other end of the linear inductance 12 is coupled directly to one plate of the capacitor 13, and the opposite plate of capacitor 13 is conductively tied to the other input terminal. A saturable reactor SR–1 is connected in shunt across the capacitor 14, and a load circuit 14 is connected to shunt the parallel-connected capacitor 13 and reactor SR–1. It will be appreciated that the saturable reactor SR–1 utilizes core material which is characterized by a substantially square hysteresis loop, in order to provide an output voltage with a substantially constant average half-wave value.

As earlier mentioned in this specification, the performance and characteristics of the magnetic voltage stabilizer shown in FIGURE 1 have been treated in the technical literature. One treatment of the mode of operation of the circuit is contained in an article by Buchhold and Stuhlinger in Technical Report No. 70, Redstone Arsenal, Huntsville, Alabama, January 15, 1952, pages 1–44. Another discussion of this type of system appears in an article by Manteuffel and McCary, in the November 1957 issue of Communication and Electronics published by the American Institute of Electrical Engineers.

For purposes of the present specification, it is believed gainful to briefly mention certain details relating to the circuit of FIGURE 1. In this figure the magnetic stabilizer forms a non-linear type of oscillatory circuit. The capacitor 13 in parallel with the saturable reactor SR–1 is supplied from the source via the linear inductance 12, and the load circuit 14 is connected in parallel with this ferroresonant circuit. If the hysteresis loop of the core material used in reactor SR–1 is properly rectangular, the average half-wave output voltage $E_0$ is inherently constant over a very wide range of input voltages provided the supply frequency is constant. The output voltage $E_0$ which is produced by the circuit shown in FIGURE 1 is a function of the frequency, the number of reactor turns, the effective cross-sectional area of the magnetic core, and the saturation flux density. It may be readily shown that the average half-wave output voltage is given by $$E_0=4fNAB_s10^{-8}$$

where:

$f$=frequency, c.p.s.
$N$=number of reactor turns
$A$=effective core cross-section, square centimeters
$B_s$=saturation flux density, Gauss In the circuit shown in FIGURE 1, the reactor SR–1 serves to determine the amount of flux swing, and acts as a switch for reversing the charge on capacitor 13 at the end of each half-cycle. When this switching action occurs, the capacitor discharges through the saturated inductance $L_s$ of reactor SR–1. This discharge current is of short duration, and high value. The peak value of such current is determined approximately by:

$$I_{peak}=E_0\sqrt{C_{13}/L_s}$$

where:

$E_0$=average value of rectangular output volts,
$C_{13}$=value of capacitor 13, and
$L_s$=saturated inductance of SR–1

The very substantial copper loss which occurs during this transient is given approximately by:

$$P_{Cu}=(Rtf)E_0^2C_{13}/2L_s$$

where:

$R$=A.C. resistance of winding on reactor SR–1,
$f$=value of supply frequency, and
$t=2\pi\sqrt{L_s/C_{13}}$=transient duration per period.

By substitution, the expression for copper loss becomes approximately:

$$P_{Cu}=E_0^2C_{13}\sqrt{C_{13}/L_s}(R\pi f)$$

As mentioned earlier in this specification, these copper losses act with the core losses when the capacitor transient occurs to drive the core far into saturation. These losses directly determine the size and weight of the heavy bulky reactors now necessitated in prior art magnetic voltage stabilizers.

According to one form of the present invention, controlled silicon rectifiers are used in conjunction with a small pulse transformer to permit the use of a very small saturable reactor which is characterized by minimal losses.

Referring now more particularly to FIGURE 2, the reference numeral 15 has been used in this figure to indicate generally an improved magnetic voltage stabilizer circuit constructed according to the teachings of the present invention. In this circuit, there is provided a set of input terminals 16. One of the input terminals 16 is serially connected to a linear inductance 17. The inductance 17 is in turn tied to one terminal of a second linear inductance 18 which may comprise a simple air-core inductor with no iron components. The juncture between the linear inductances 17 and 18 is connected to one plate of a capacitor 19. The opposite plate of capacitor 19, on the other hand, is tied directly to the input terminal 16. A load circuit 20 is connected in shunt across the capacitor 19 shown in this illustration. Within the circuit illustrated in this figure a small pulse transformer PT–1 provided with a pair of secondary windings W–1 and W–2 is employed. The transformer PT–1 is connected in series with a saturable reactor SR–2, and the resulting series circuit is coupled between one end of the linear inductance 18 and the plate of capacitor 19 which is electrically common with the input terminal 16. It will be appreciated that the reactor SR–2 includes a flux permeable core which is characterized by a substantially rectangular hysteresis loop.

To the right of the reactor SR–2, the reference characters SCR–1 are used to identify a first controlled silicon rectifier. The reference characters SCR–2 to the left of reactor SR–2 are used to designate a second controlled silicon rectifier. The rectifiers SCR–1 and SCR–2 are provided with control electrodes 21 and 22, respectively. The control electrodes 21 and 22 are connected to the cathode electrodes of the respective silicon rectifiers SCR–1 and SCR–2 through the secondary windings W–1 and W–2 of the pulse transformer PT–1. It will be appreciated that the secondary windings W–1 and W–2 of this transformer act to provide gating potentials to the silicon rectifiers SCR–1 and SCR–2.

As used throughout the present specification, the arrow symbol in the controlled silicon rectifiers and in all diodes is used to identify the anode elements of such units while the small lines which intersect the apex of the arrow symbol will be taken to designate the cathode element of these units.

Let us assume in the circuit shown in FIGURE 2 that during one half-cycle of operation, with positive polarity arbitrarily applied to the upper plate of the capacitor 19, the volt-time integral reaches a value sufficient to cause saturation in the core of saturable reactor SR–2. At the instant of saturation, the current will increase sharply, and will be transferred by induction to winding W–2 of the small pulse transformer PT–1 to effect immediate ignition of the controlled rectifier SCR–2. The current flow through the reactor SR–2 will therefore terminate, and the capacitor 19 will attempt to reverse potential by discharging through linear inductor 18 in a short but readily determinable time interval. Since the time interval can be made very small, by making the inductance of inductor 18 as low as a few micro-henries, the time required to reverse the capacitor polarity will be a very small fraction of the time required to experience a half-cycle of supply frequency.

At the end of this transient interval, the capacitor discharge current passes through zero and rectifier SCR–2 becomes non-conductive. The time of one half-cycle of supply frequency now elapses, until with reversed polarity at capacitor 19, the reactor SR–2 saturates in the opposite direction of magnetization, and controlled silicon rectifier SCR–1 is ignited by means of the current transformation affected by winding W–1 of the pulse transformer PT–1. The capacitor 19 will again seek to reverse polarity as described immediately above, and the cycle of operations starts all over again.

For the purpose of providing a better understanding of the operation of the new type of magnetic voltage stabilizer and to set forth more clearly the results achievable with this device, reference is now made to FIGURES 2*a* and 2*b* of the accompanying patent drawings. (These figures illustrate as a function of time the stabilizer output voltage, discharge currents of capacitor 19, and currents within the winding of saturable reactor SR–2.)

In FIGURE 2*a*, curve E represents the output voltage wave shape while curves $I_d$ and $I_m$ show, in proper time relationship to curve E, wave shapes of the discharge current and the magnetizing current of saturable reactor SR–2, respectively. Two time intervals are distinguished, namely time $t_m$ during which a flux change in SR–2 takes place and times $t_d$ during which the discharge transients occur. For the purpose of better display, time $t_d$ is greatly exaggerated in value in comparison with $t_m$. The wave shape of the output voltage is shown arbitrarily in FIGURE 2*a* for the case of nominal operation as defined in the article cited earlier of Buchhold and Stuhlinger.

Considering now the first positive half-cycle of FIGURE 2*a*, the first hatched area I defines the amount of flux the saturable reactor SR–2 is capable of absorbing when its flux changes from its negative residual point toward positive saturation. During this time $t_m$ a very small magnetizing current $I_m$ flows through SR–2 which experiences a very abrupt increase at the instant of saturation causing ignition of controlled rectifier SCR–2 as described before. Capacitor 19 discharges now during time $t_d$ by way of inductor 18 while its voltage reverses its polarity. Since this discharge is of oscillatory nature, the discharge current $I_d$ will pass through zero at the end of time $t_d$ causing SCR–2 to become nonconductive.

During time $t_d$ saturable reactor SR–2 remained essentially at its positive residual point since no flux change could take place while SCR–2 was in its conducting state, thereby short-circuiting SR–2. At the instant where controlled rectifier SCR–2 becomes open circuited, voltage of reverse polarity is now applied to the winding of SR–2. The saturable reactor absorbs now a volt-time integral represented by the second hatched area II when its flux changes from its positive residual point toward negative saturation. Naturally areas I and II must be equal in value. At the instant of negative saturation, again a sharp increase of the magnetizing current $I_m$ occurs causing ignition of controlled rectifier SCR–1 and a following discharge of capacitor 19 with polarity reversal of its voltage to its original polarity, at which the series of events described started.

In commonly known magnetic stabilizers such as shown in FIGURE 1, the capacitor must discharge through the saturated inductance of the relatively bulky saturable reactor SR–1. The saturated inductance of such a reactor has a given value for the most economical design with regard to weight, efficiency and permissible temperature rise, and cannot be reduced below this value. This also means that the discharge time $t_d$ cannot be reduced below a given value. In general, this discharge time is in the order of 15% of time $t_m$ in case of conventional stabilizers.

The circuit arrangements of the new stabilizer permit freedom of choice for the value of time $t_d$ since it is determined by the value of inductance 18 which can be chosen solely on the basis of maximum permissible discharge currents passing through the controlled rectifiers. In practical applications, it has been possible to reduce this discharge time to about 5% of time $t_m$.

Reduction of the discharge time $t_d$ to a small value as achieved by the circuit arrangement of the new stabilizer is of a twofold advantage. The first advantage is based on the fact that a much better square wave shape of the output voltage can be obtained which requires less filtering means in cases where the output voltage is rectified. Combined with this advantage is the avoidance of large discharge losses normally occurring in conventional stabilizers. Reduced discharge losses result in less attenuation during the time $t_d$ of voltage reversal, which also contributes to an improved square wave shape.

In order to explain the second advantage, reference is now made to FIGURE 2*b*, which illustraes three different output voltage wave shapes which will result from changes of the line voltage applied to the stabilizer. A line voltage variation of about ±30 percent around the nominal voltage was chosen for construction of these wave shapes, which has been discussed in great detail in the article mentioned earlier of Buchhold and Stuhlinger.

The voltage versus time curves A, B, and C of FIGURE 2*b* represent the cases of low, nominal and high line voltage, respectively. Again, like in FIGURE 2*a*, the discharge time $t_d$ is greatly exaggerated in value for purposes of a more visually apparent display of the second advantage.

The nonhatched areas I, II, and III represent the volt-time integral absorbed by reactor SR–2 during time $t_m$. They are equal in value since this reactor can only permit a distinct flux variation during its nonsaturated condition. Instantaneous values $e_1$, $e_2$, and $e_3$ of the output voltage at the instant where the discharge transient starts are different for the three cases. The hatched areas $a_1+a_2$, $b_1+b_2$, $c_1+c_2$ represent additional volt-time integrals where $c_1+c_2>b_1+b_2>a_1+a_2$ since $e_3>e_2>e_1$.

In the case of conventional stabilizers, such as that shown in FIGURE 1, these areas exhibit the flux absorbed by saturable reactor SR–1 during its saturated condition. In case of the new improved stabilizer, these areas represent the flux in inductor 18 of FIGURE 2. As can be seen by inspection of FIGURE 2*b*, these hatched areas contribute to the apparent half-cyclic average value of the output voltage. Since they become larger with increasing line voltage, they will cause an increase of the output voltage with increasing line voltage.

It now becomes apparent that the discussed increase in output voltage is a direct function of the discharge time $t_d$ since these areas are linearly proportional to $t_d$. Since the new stabilizer permits, as discussed before, the reduction of discharge time to its absolute minimum, it exhibits a much higher degree of voltage stabilization with regard to line voltage variations in comparison with conventional magnetic stabilizers.

In practice, inductor 18 may take the form of a simple air core inductance with no iron components. Litz wire may be used in winding the inductor in order to sharply reduce skin and proximity effect losses. The reactor SR–2 can be of very small physical size, since its purpose is simply to determine a definite level of flux swing and obtain a stabilizer output voltage substantially independent of input voltage variations.

In many applications of magnetic amplifiers where only an input voltage of small magnitude is available, it is desirable to operate the capacitor 19 in FIGURE 2 at a much larger voltage than the input voltage. This is because a capacitor of given volt-ampere rating will have less weight. This problem occurs where an output voltage larger than the value of the supply voltage is required to be furnished by a magnetic voltage stabilizer.

In prior art magnetic stabilizers, this increased capacitor voltage, and the larger output voltage, is obtained by using a large bulky saturable reactor as a step-up autotransformer. Or, such units sometimes take the form of a two winding transformer rather than an auto-transformer. In such arrangements, the saturable reactor windings carry not only large peak discharge currents at the end of each half-cycle, but are also required to carry load current. The resulting problem of heat dissipation is extremely severe, and proper insulation for the increased voltage stress is difficult to provide on commonly employed toroidal wound square-loop reactors. Moreover, because of the large discharge currents, and the unavoidable leakage inductance in the transformer winding, the secondary voltage wave shape is distorted by the presence of many higher harmonics. Where large secondary output voltages are required, an additional conventional-type transformer has been necessitated in many cases.

With the improved embodiment of the invention shown in FIGURE 3 of the accompanying patent drawings, it is possible to employ a high volt-ampere capacitor rating and to produce an increased value of output voltage.

It will be appreciated preliminarily that the operation of the circuit in FIGURE 3 is essentially the same as that explained in connection with FIGURE 2, insofar as the switching operation of the controlled silicon rectifiers is concerned. In FIGURE 3, however, the output transformer carries only the load current in its windings, and is not subjected to transient discharging currents from the capacitor used in the circuit.

Referring now to the detailed description of this embodiment of the invention, and turning more particularly to FIGURE 3, the reference numeral 23 has been used to designate generally an embodiment of the improved stabilizing circuit which is useful in producing increased output voltage.

The reference numerals 24 are used in this circuit to identify a set of input terminals. One of the input terminals 24 is connected directly to a linear inductance 25. In the right hand portion of the drawing there is shown a transformer 26 provided with a tapped primary winding. The tap junction of the primary of transformer 26 is connetced directly to one end of the linear inductance 25.

The opposiste ends of the primary windings, on the other hand, are connected to opposite plates of a capacitor 27. The primary winding of a small pulse transformer PT–2 provided with a pair of secondary windings W–1 and W–2 is connected in series with a saturable reactor SR–3. The series circuit thus formed is tied between the tap junction of the primary winding and the input terminal 24 electrically common with the lower plate of capacitor 27.

The primary winding of transformer 26 is shunted by a linear inductance 28 connected in series with a controlled silicon rectifier SCR–3. A second oppositely poled controlled silicon rectifier SCR–4 is connected in shunt across the first controlled silicon rectifier. The rectifiers SCR–3 and SCR–4 are provided with control electrodes 29 and 30 respectively, and these electrodes are coupled to the cathode elements of the silicon rectifiers through primary windings W–1 and W–2 respectively, of the pulse transformer PT–2.

The secondary winding of transformer 26 is connected directly to the load circuit 31.

With the embodiments of the invention thus far described, the previously employed large bulky reactors are replaced by small components with a reduction of approximately 40% in the overall weight of the magnetic stabilizer. Moreover, voltage reversal of the load voltage can be achieved at an extremely rapid rate with less attenuation during reversal because of the reduced losses. This results in a markedly superior square wave shape for the output voltage, and requires less filtering circuitry in cases where the output voltage is rectified. In addition, the constancy of the output voltage with varying input voltage is greatly improved by comparison to conventional voltage stabilizers. The latter improvement results predominantly from the very small discharge time of the capacitor in comparison to the time of one half-cycle of the supply frequency. Variations of the volt-time integral during the discharge transient, depending on changes in the supply voltage, are therefore greatly reduced.

Returning to the detailed description of the invention, and turning now to FIGURE 4, it will be noted that the reference numeral 32 is used to indicate generally a form of the magnetic voltage stabilizer in which the use of a plurality of diodes allows the pulse transformer to be dispensed with. In the circuit, the reference numerals 33 are used to identify a set of input terminals. The uppermost terminal is connected to one end of a first linear inductance 34, the other end of which is tied to one plate of a capacitor 35. The opposite plate of the capacitor 35 is conductively tied to the other input terminal, and a load circuit 36 is connected in shunt across the plates of the capacitor. A second linear inductance 37 is connected to the juncture between inductance 34 and capacitor 35.

As illustrated in the central portion of the drawing, a first diode D–1 is connected to form a series circuit with a saturable reactor SR–4 and a second oppositely poled diode D–2. The resulting series circuit is connected in parallel between one end of the linear inductance 37 and the input terminal 33 which is electrically common with the lower plate of capacitor 35.

To the right of the saturable reactor SR–4 there is shown a controlled silicon rectifier SCR–5. This silicon rectifier is connected in shunt with the circuit comprised of the oppositely poled diodes D–1, D–2, and the saturable reactor. To the left of this circuit, a second controlled silicon rectifier SCR–6 is illustrated, and this rectifier is also connected in parallel with the reactor and the diodes.

The cathode element of the diode D–1 is coupled to the control electrode 39 of rectifier SCR–6 by means of a diode D–4 and a resistor R–2 connected in series. The cathode element of the diode D–2 is similarly coupled to the control electrode 38 of rectifier SCR–5 by means of a diode D–3 and a resistor R–1 connected in series.

As earlier mentioned in the present specification, FIGURE 4 differs from the previous embodiments by employing diodes rather than a pulse transformer. The four diodes D–1, D–2, D–3 and D–4 are used in FIGURE 4 to switch the controlled silicon rectifiers at the end of each half-cycle. In order to explain such action, it may be assumed that the polarity at the juncture between the upper plate of capacitor 35 and inductors 34 and 37 is positive at the start of a given half-cycle. Under this condition, magnetizing current will flow through the path which includes inductor 37, diode D–2, reactor SR–4, and diode D–4 to the control electrode 39 and cathode of controlled rectifier SCR–6. Diodes D–1, D–3, and controlled rectifier SCR–5 cannot carry current with this assumed polarity. At the instant reactor SR–4 saturates, however, current therethrough rises sharply and the silicon rectifier SCR–6 immediately fires. The capacitor 35 then discharges through linear inductance 37 and rectifier SCR–6 and reverses the polarity of the voltage existent on the capacitor plates.

Since the discharge current reaches zero after the end of the interval required for charge reversal on the capacitor 35, rectifier SCR–6 will become non-conductive and remain blocked for the succeeding half period. Magnetizing current will now flow through the path which includes diode D–1, reactor SR–4, diode D–3, resistor R–1, rectifier SCR–5 and inductance 37 in a direction opposite to that occurring before. If reactor SR–4 now saturates in the opposite direction of magnetization, rectifier SCR–5 fires and the capacitor 35 will reverse polarity to return to the originally assumed condition.

Continuing with the detailed description of the invention, reference will now be made to FIGURE 5, in which the reference numeral 40 is used to generally designate an embodiment of the invention in which the control electrodes of the silicon rectifiers are directly connected without the use of diodes or a pulse transformer.

In this circuit, a pair of input terminals 41 are provided. One of the terminals 41 is tied directly to one end of a first linear inductance 42. The opposite end of the linear inductance 42 is tied to one plate of a capacitor 43, the opposite plate of which is connected to the remaining input terminal. A linear second inductance 45 is tied to the juncture between the inductance 42 and the capacitor 43, and a load circuit 44 is connected in parallel with the plates of the capacitor.

In the central portion of the drawing, there is illustrated a series circuit which includes a first resistor R–3, a saturable reactor SR–5, and a second resistor R–4. This circuit is connected between one plate of capacitor 43 and an end of the linear inductance 45.

To the right of the reactor SR–5 there is shown a controlled silicon rectifier SCR–7. A second controlled silicon rectifier SCR–8 is illustrated to the left of the reactor. Both silicon rectifiers are connected in parallel with the circuit which includes resistance R–3, R–4 and reactor SR–5.

The juncture between resistor R–3 and reactor SR–5 is tied directly to control electrode 46 of the silicon rectifier SCR–8. Conversely, the juncture between the reactor SR–5 and resistor R–4 is conductively connected to the control electrode 47 for silicon rectifier SCR–7.

In FIGURE 5, the reactor SR–5 swings between positive and negative saturation. The circuit fires first through the path which includes resistor R–4, reactor SR–5 and rectifier SCR–8. Then, the circuit fires through the path which includes resistor R–3, reactor SR–5, and rectifier SCR–7 at the end of alternate half-cycles. Resistors R–3 and R–4 are of equal low ohmic value and serve to limit the voltage drop across the gate circuit and bypass the magnetizing current of the saturable reactors in either direction. The power handling capability of the stabilizer shown in FIGURE 5 is completely independent of the physical size of the small reactor SR–5, and is governed only by the values of inductance 42 and capacitance 43. This feature permits the building of a stabilizer for power ratings in the order of kilowatts with the use of a very small voltage controlling reactor.

In concluding the detailed description of the invention, reference to FIGURE 6 of the accompanying drawings will now be made. As earlier mentioned in the description of the figures of the drawings, FIGURE 6 illustrates an improved magnetic voltage stabilizer in which the energy stored in the inductive field is dissipated in order to protect the system from over-voltages. Since FIGURE 6 represents a modification of the circuit shown in FIGURE 5, corresponding parts have been identified by using the same reference numerals with the letter "A" appended thereto, or with prime symbols, to indicate identity of function.

As known to those skilled in the art, controlled silicon rectifiers exhibit a finite recovery time in returning to the current blocking state. When current flowing in a first direction through such a rectifier drops to zero, and attempts to flow in the reverse direction, the recovery time for the rectifier becomes significant. This means that internal current will seek to flow in the reverse direction. The time-current product for this phenomena has been found to depend greatly on the rate of change of the current at the instant of passing through zero. The time-current product also depends upon the magnitude of the current previously flowing in the forward direction.

For instance, with embodiments of the invention of the type shown in FIGURE 5, a sizable current of short duration and sinusoidal shape passes through the inductance 45 and alternately through the control rectifiers SCR–7 or SCR–8 at the end of each half-cycle. This current may overshoot and flow in the reverse direction for a short interval. This means that at the instant of final interruption of current a magnetic energy of readily determinable value has been stored in the inductance 45. This stored energy may be undesirable since, at the instant of final current interruption, a voltage pulse appears at inductance 45 across the terminals of the rectifiers SCR–7 and SCR–8. Although the presence of this pulse does not detract materially from the operability, or superiority over prior art magnetic voltage stabilizers, it is possible to attenuate this pulse according to the invention.

In FIGURE 6 this is done by shunting the linear inductance 45A with a non-inductive resistance 50. The resistor serves to dissipate the energy in the field of inductor 45A.

It is also possible to dissipate this energy by connecting a small capacitor 51 in series with a small resistor 52 across the terminals of the controlled rectifiers. This series circuit may extend from the uppermost end of resistor R–4′ in FIGURE 6 to the lowermost end of resistor R–3′, as shown in dashed lines in the drawing. Both solutions to the problem are very effective in suppressing the inductive voltage pulse produced by the stored energy in the magnetic field.

In place of the foregoing expedients, a more preferable solution is to replace the linear inductor 45 shown in FIGURE 6 with a non-linear inductor provided with a molybdenum-permalloy powder core or equivalent type core material. A resistance of much larger ohmic value may be connected in shunt with this non-linear inductance, in a manner to be explained directly below. The non-linear inductance is designed so that its impedance when the internal current reaches zero in one direction is considerably higher than at the peak value of current. The inductive discharge current then exhibits a wave shape with a slow rate of change at the point where it reaches zero, and seeks to reverse polarity. Much less energy is therefore stored in the inductance 45A at the instant of final cutoff in the controlled rectifiers, and the peak value of the voltage pulse is markedly diminished in value. It is therefore possible to use a much greater ohmic value for resistor 50 for suppressing any remaining voltage pulse, and circuit losses are substantially reduced. The foregoing dscribed protective means may as well be employed within the circuits of FIGURES 2, 3 and 4 described hereinbefore.

In conclusion, it will now be evident that I have disclosed operative embodiments of my invention in clear and concise terms, as required by the patent statute. However, it will be equally evident that certain modifications and alterations may be made therein without departing from the spirit and scope of the appended claims.

What I claim is:

1. In a circuit arrangement having access to a source of alternating voltage, a capacitor and a saturable reactor connected in parallel to draw current from said source through a linear inductor, a second inductor, and means including at least two parallel connected controlled rectifiers connected in series with said second inductor for alternately discharging the capacitor through the second inductor on each half-cycle of the alternating voltage source.

2. In a magnetic voltage stabilizer circuit having access to a source of alternating supply voltage, a pair of input terminals, a first linear inductor having one end connected to one of said input terminals, a capacitor serially coupled between the opposite end of said first linear inductor and the other of said input terminals in order to supply operating voltage to a load circuit coupled across the plates of said capacitor, a second linear inductor having one end connected to the juncture between said capacitor and said first linear inductor; means including a pair of oppositely poled controlled silicon rectifiers, each provided with individual control electrodes; and means connecting said rectifiers and a saturable reactor in parallel between the opposite end of said second linear inductor and a plate of said capacitor electrically common with said other input terminal.

3. In a magnetic voltage stabilizer circuit having access to a source of alternating supply voltage, a pair of input terminals, a first linear inductor having one end connected to one of said input terminals; a capacitor serially coupled between the opposite end of said linear inductor and the other of said input terminals in order to supply operating voltage to a load circuit coupled across the plates of said capacitor, a second linear inductor having one end connected to the juncture between said capacitor and said first linear inductor, means including first and second oppositely poled controlled silicon rectifiers each provided with individual control electrodes, means connecting said rectifiers and a saturable reactor in parallel between the opposite end of said second linear inductor and a plate of said capacitor electrically common with said other input terminal, and means including a pulse transformer having a primary winding connected in series with said saturable reactor and a pair of secondary windings connected between the control electrodes and the cathode electrodes of said first and second resctifier, respectively.

4. In a magnetic voltage stabilizer circuit having access to a source of alternating supply voltage, a pair of input terminals, a first linear inductor having one end connected to one of said input terminals, a capacitor serially coupled between the opposite end of said linear inductor and the other of said input terminals in order to supply operating voltage to a load circuit coupled across the plates of said capacitor, a second linear inductor having one end connected to the juncture between said capacitor and said first linear inductor; means including a saturable reactor, and first and second oppositely poled controlled silicon rectifiers provided with individual control electrodes, means connecting said reactor and rectifiers in parallel between the opposite end of said second linear inductor and the plate of said capacitor electrically common with said other input terminal, said last-mentioned means including pulse transformer means connected to fire said first and second silicon rectifiers in sequence.

5. In a magnetic voltage stabilizer circuit having access to a source of alternating supply voltage, a pair of input terminals, a first linear inductor having one end connected to one of said input terminals, a capacitor serially coupled between the opposite end of said linear inductor and the other of said input terminals in order to supply operating voltage to a load circuit coupled across the plates of said capacitor; a second linear inductor having one end connected to the juncture between said capacitor and said first linear inductor, means including a saturable reactor, and a pair of oppositely poled controlled silicon reactifiers provided with individual control electrodes, means connecting said reactor and rectifiers in parallel between the opposite end of said second linear inductor and the plate of said capacitor electrically common with said other input terminal, said last-mentioned means including a first pair of oppositely poled diodes connected in series with said reactor on opposite sides thereof, and a diode interconnected between each of said control electrodes and the opposite ends of said saturable reactor.

6. In a magnetic voltage stabilizer circuit having access to a source of alternating supply voltage, a pair of input terminals, a first linear inductor having one end connected to one of said input terminals, a capacitor serially coupled between the opposite end of said linear inductor and the other of said input terminals in order to supply operating voltage to a load circuit coupled across the plates of said capacitor, a second linear inductor having one end connected to the juncture between said capacitor and said first linear inductor, means including first and second oppositely poled controlled silicon rectifiers provided with individual control electrodes, means including a saturable reactor connected in parallel with said rectifiers between the opposite end of said second linear inductor and the plate of said capacitor electrically common with said other input terminal, and means including a plurality of diversely poled diode means connected in circuit with said reactor to alternately fire said first and second rectifiers.

7. In a magnetic voltage stabilizer circuit having access to a source of alternating supply voltage, a pair of input terminals, a first linear inductor having one end connected to one of said input terminals, a capacitor serially coupled between the opposite end of said linear inductor and the other of said input terminals in order to supply operating voltage to a load circuit coupled across the plates of said capacitor, a second linear inductor having one end connected to the juncture between said capacitor and said first linear inductor; means including first and second oppositely poled controlled silicon rectifiers provided with individual control electrodes, means including a saturable reactor connected in parallel with said rectifiers between the opposite end of said second linear inductor and the plate of said capacitor electrically common with said other input terminal, and means directly interconnecting the control electrodes of said rectifiers to the opposite ends of said saturable reactor.

8. In a magnetic voltage stabilizer circuit having access to a source of alternating supply voltage, a pair of input terminals, a first linear inductor having one end connected to one of said input terminals, a capacitor serially coupled between the opposite end of said linear inductor and the other of said input terminals in order to supply operating voltage to a load circuit coupled across the plates of said capacitor, a second linear inductor having one end connected to the juncture between said capacitor and said first linear inductor, means including first and second oppositely poled controlled silicon rectifiers each provided with individual control electrodes, means including a saturable reactor connected in parallel with said rectifiers between the opposite end of said second linear inductor and the plate of said capacitor electrically common with said other input terminal, means directly interconnecting the control electrodes of said rectifiers to the opposite ends of said saturable reactor, and means connected in said circuit to dissipate energy stored in the magnetic fields therof, said last-mentioned means comprising a non-inductive resistor connected in shunt across said second linear inductance.

9. In a magnetic voltage stabilizer circuit having access to a source of alternating supply voltage, a pair of input terminals, a first linear inductor having one end connected to one of said input terminals, a capacitor serially coupled between the opposite end of said linear inductor and the other of said input terminals in order to supply operating voltage to a load circuit coupled across the plates of said capacitor, a second linear inductor having one end connected to the juncture between said capacitor and said first linear inductor, means including first and second oppositely poled controlled silicon rectifiers provided with individual control electrodes, means including a saturable reactor connected in parallel with said rectifiers between the opposite end of said second linear inductor and the plate of said capacitor electrically common with said other input terminal, means directly interconnecting the control electrodes of said rectifiers to the opposite ends of said saturable reactor, and means connected in said circuit to dissipate stored magnetic energy, said last-mentioned means comprising a series R-C network connected in shunt across the oppositely poled controlled silicon rectifiers.

10. In a magnetic voltage stabilizer circuit having access to a source of alternating supply voltage, a pair of input terminals, a linear inductor having one end connected to one of said input terminals; a capacitor serially coupled between the opposite end of said linear inductor and the other of said input terminals in order to supply operating voltage to a load circuit coupled across the plates of said capacitor, a non-linear inductor having one end connected to the juncture between said capacitor and said linear inductor; means including first and second oppositely poled controlled silicon rectifiers provided with individual control electrodes, means including a saturable reactor connected in parallel with said rectifiers between the opposite end of said non-linear inductor and the plate of said capacitor electrically common with said other input terminal, and a non-inductive resistor connected in shunt across said nonlinear inductor to asisst in dissipating stored magnetic energy within the circuit to eliminate over-voltages.

11. In a magnetic voltage stabilizer circuit having access to a source of alternating supply voltage, a pair of input terminals, a first linear inductance having one end connected to one of said input terminals, a first transformer provided with a tapped primary winding and a secondary winding adapted to feed a load circuit; a capacintor serially interconnected between opposite ends of said tapped primary winding, one plate of said capacitor being connected to the other input terminal; a second linear inductor coupled in series with a first controlled silicon rectifier and connected in parallel with said capacitor, a second silicon rectifier coupled in shunt with said first rectifier and oppositely poled with respect thereto, pulse transformer means provided with primary and secondary windings, means including a saturable reactor connected in series with said primary winding of said pulse transformer between the tap junction on the primary winding of said first transformer and said other input terminal, and means including said secondary windings of said pulse transformer interconnecting the control electrodes of each rectifier to the respective cathode electrodes thereof.

12. In a circuit arrangement having access to a source of alternating voltage, a capacitor, a first inductor connected in series with said capacitor, a second inductor, a parallel connected pair of oppositely poled controlled rectifiers connected in series with said second inductor, said series circuit being connected in parallel with said capacitor, and means for alternately controlling the switching of said controlled rectifiers, said means including a saturable reactor connected in parallel with said pair of controlled rectifiers to sense the volt time integral of the capacitor voltage during each half-cycle.

13. In a circuit arrangement having access to a source of alternating voltage, a series circuit comprising input inductive means and a capacitor, a pair of oppositely poled controlled rectifiers in parallel arrangement connected in series with current limiting inductive means, said series-parallel combination being connected in shunt with said capacitor, and means for alternately controlling the switching of said controlled rectifiers, said means including saturable reactor means connected in parallel with said controlled rectifiers to sense the volt-time integral of the capacitor voltage during each half-cycle.

References Cited in the file of this patent

UNITED STATES PATENTS 2,444,794 Uttal et al. ------------- July 6, 1948